(12) United States Patent
Takamatsu et al.

(10) Patent No.: US 7,489,857 B2
(45) Date of Patent: Feb. 10, 2009

(54) PROCESS AND APPARATUS FOR PRODUCING POWDERS OF METAL COMPOUND CONTAINING OXYGEN, AND THE POWDERS PRODUCED BY THE PROCESS

(75) Inventors: Yukichi Takamatsu, Kanagawa (JP); Koji Kiriyama, Kanagawa (JP); Akira Asano, Kanagawa (JP); Takafumi Ishii, Kanagawa (JP)

(73) Assignee: Japan Pionics Co., Ltd., Tokyo (JP)

( * ) Notice: Subject to any disclaimer, the term of this patent is extended or adjusted under 35 U.S.C. 154(b) by 0 days.

(21) Appl. No.: 11/735,732

(22) Filed: Apr. 16, 2007

(65) Prior Publication Data
US 2007/0183946 A1 Aug. 9, 2007

Related U.S. Application Data

(62) Division of application No. 11/076,948, filed on Mar. 11, 2005, now Pat. No. 7,297,322.

(30) Foreign Application Priority Data
Mar. 22, 2004 (JP) ............................... 2004-82629

(51) Int. Cl.
*C23C 14/00* (2006.01)
*C23C 16/00* (2006.01)
*B01J 10/02* (2006.01)

(52) U.S. Cl. .................. 392/388; 422/129; 422/198; 118/712

(58) Field of Classification Search .................. 422/198, 422/129; 392/388; 424/200.1; 118/718
See application file for complete search history.

(56) References Cited

U.S. PATENT DOCUMENTS

| 3,362,784 A | 1/1968 | Kamran |
| 4,765,920 A | 8/1988 | Gattuso et al. |
| 4,777,031 A | 10/1988 | Senecal et al. |

(Continued)

Primary Examiner—Walter D Griffin
Assistant Examiner—Natasha Young
(74) Attorney, Agent, or Firm—Antonelli, Terry, Stout & Kraus, LLP.

(57) ABSTRACT

An apparatus for producing powders of metal compound containing oxygen comprising a liquid flow controller, a vaporizer and a reactor, which consists essentially of: means for feeding a gas containing a material and oxygen; means for heating the gas from the side surface of the feeding means; means for cooling the gas positioned at the downstream side of the feeding means; and means for receiving the product generated by the reaction. A process and products for producing powders of metal compound containing oxygen comprising the steps of: feeding at least one material selected from a liquid material and a solution material obtained by dissolving solid ingredient in organic solvent via a liquid flow controller into a vaporizer; vaporizing the materials in the vaporizer; adding oxygen; heating; cooling; and crystallizing. The process and the apparatus enable easily mass-producing fine powders of metal compound containing oxygen used as materials for optical crystals, nonlinear crystals or magneto-optical crystals with reasonable production cost.

3 Claims, 4 Drawing Sheets

U.S. PATENT DOCUMENTS 5,391,354 A * 2/1995 Petersen et al. ............. 422/129
5,582,771 A * 12/1996 Yoshimaru et al. ..... 252/519.53
6,416,862 B1 * 7/2002 Kogoi et al. ................ 428/402
6,793,842 B2 9/2004 Akimoto et al.
7,186,393 B2 * 3/2007 Kogoi et al. ................ 423/326
2002/0067917 A1 * 6/2002 Takamatsu et al. .......... 392/388
2003/0111007 A1 * 6/2003 Takamatsu et al. ............ 117/86
2003/0143153 A1 7/2003 Boulos et al.
2004/0241189 A1 * 12/2004 Ishii et al. ................ 424/200.1
2005/0118094 A1 6/2005 Zhang

* cited by examiner

PROCESS AND APPARATUS FOR PRODUCING POWDERS OF METAL COMPOUND CONTAINING OXYGEN, AND THE POWDERS PRODUCED BY THE PROCESS

This application is a Divisional application of application Ser. No. 11/076,948, filed Mar. 11, 2005, now U.S. Pat. No. 7,297,322, the contents of which are incorporated herein by reference in their entirety.

TECHNICAL FIELD

The present invention relates to an apparatus and a process for efficiently producing powders of metal compound containing oxygen that are used as ingredient of optical crystal, nonlinear crystal or magneto-optical crystal. The present invention also relates to the fine powders of metal compound containing oxygen produced by the process at low cost.

BACKGROUND ART

In the field of semi-conductive crystal, powders of metal compound containing oxygen such as lithium niobate, niobic acid tantalum or barium titanate is employed as material of optical crystal; powders of metal compound containing oxygen such as bismuthic acid barium, bismuthic acid silicon or bismuthic acid germanium is employed as material of nonlinear crystal; and powders of metal compound containing oxygen such as lithium niobate or lithium tantalate is employed as material of magneto-optical crystal. For example, lithium niobate is known as a transparent crystal without rendering color or tinted with pale yellow, and as revealing ferroelectricity. Also, surface acoustic wave devices, Q-switches, optical modulators, optical switches and so on that took advantages of electro-optic effect, nonlinear optical effect, ultrasonic propagation, piezoelectric effect, etc. as the characteristics of lithium niobates are put into practical use.

Conventionally, the powders of metal compound containing oxygen are produced in general by sol gel method, sintering method or sputtering method. Japanese Unexamined Patent Application Laid-Open Nos. Hei 5-9023, Hei 7-21831, Hei 9-208227, 2000-113898 and 2002-356326 disclose the sol-gel method, in which, for example, the powders of metal compound containing oxygen are obtained by dissolving several kinds of metal alkoxide in amine, hydrolyzing and adding a precipitant, thereafter drying precipitation. Japanese Unexamined Patent Application Laid-Open No. Hei 10-338524, for example, discloses the sintering method, in which the powders of metal compound containing oxygen are obtained by mixing several kinds of metal oxide and sintering the resultant mixture. Further, Japanese Unexamined Patent Application Laid-Open No. Hei 8-277467 discloses the sputtering method, in which the powders of metal compound containing oxygen are obtained after repeating the sintering and crushing the sintered objects several times, hot pressing and sputtering the sintered objects with aiming them as a target.

SUMMARY OF THE INVENTION

However, it was difficult for the sol gel method to produce fine powders of metal compound containing oxygen. Further, although the sintering method and the sputtering method enable to produce fine powders of metal compound containing oxygen, they had disadvantages that the production cost was expensive.

Furthermore, all the foregoing conventional methods had impropriety that they are not suitable for mass production.

Therefore, an object of the present invention is to provide a process and an apparatus for easily mass-producing fine powders of metal compound containing oxygen used as materials for optical crystals, nonlinear crystals or magneto-optical crystals with reasonable production cost.

As a result of intensive extensive research and investigation made by the present inventors in order to achieve the object, it has been found that the generation of the powders of metal compound containing oxygen by a gas phase crystal growth enable to easily mass-produce fine powders of metal compound containing oxygen with reasonable cost; and the present invention was completed.

Accordingly, the present invention provides an apparatus for producing powders of metal compound containing oxygen comprising a liquid flow controller, a vaporizer and a reactor, which consists essentially of: means for feeding a gas containing a material and oxygen; means for heating the gas from the side surface of the feeding means; means for cooling the gas positioned at the downstream side of the feeding means; and means for receiving the product generated by the reaction.

Also, the present invention provides a process for producing powders of metal compound containing oxygen comprising the steps of: feeding at least one material selected from a liquid material and a solution material obtained by dissolving solid ingredient in organic solvent via a liquid flow controller into a vaporizer, vaporizing the materials in the vaporizer; adding oxygen; heating; cooling; and crystallizing

PREFERRED EMBODIMENT OF THE INVENTION

Figure 1:
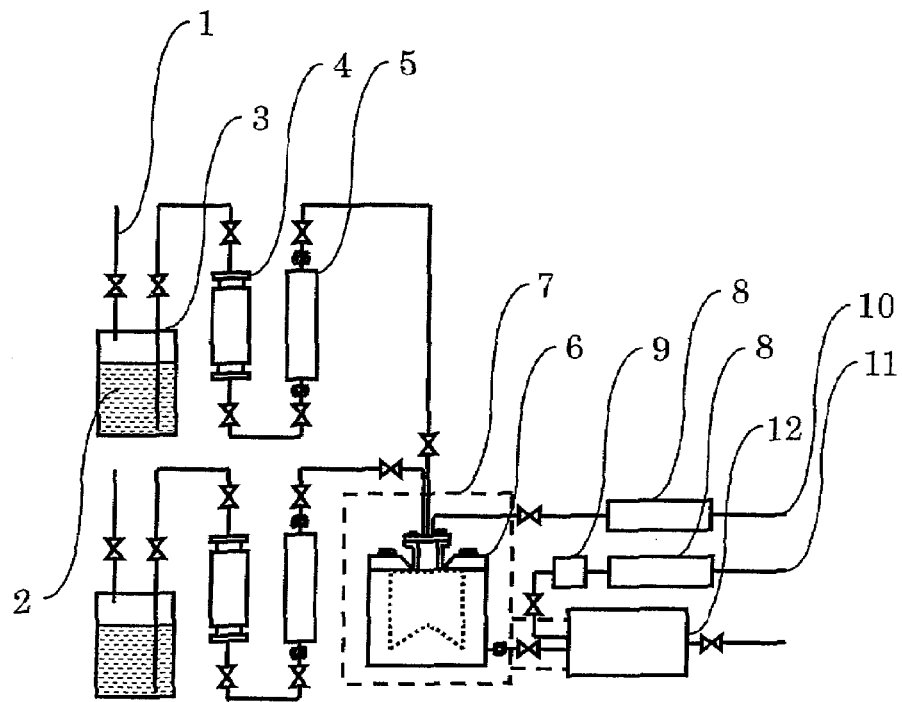
FIG. 1 is a block diagram illustrating one embodiment of an apparatus for producing powders of metal compound containing oxygen in accordance with the present invention.

The present invention is applied to the process and the apparatus for producing the powders of metal compound containing oxygen used as the materials for optical crystals, nonlinear crystals or magneto-optical crystals, however, it is preferably applied to produce, in particular, the powders of metal compound containing oxygen having ferroelectricity, and to produce powders of metal compound containing oxygen having perovskite structure. Namely, both the powders of metal compound containing oxygen having the ferroelectricity and the powders of metal compound containing oxygen having perovskite structure each produced in accordance with the present invention exhibit minuteness and excellent quality without requiring expensive production costs.

Examples of the powders of metal compound containing oxygen in the present invention include, but not limited to, lithium niobate, lithium tantalate, barium titanate, lead titanate, niobic acid tantalum, bismuthic acid barium, bismuthic acid silicon, bismuthic acid germanium, etc.

A liquid material or a solution material prepared by dissolving a solid ingredient in organic solvent are employed as the material for the powders of metal compound containing oxygen in the present invention.

An example of the liquid material containing silicon is tetra ethoxy silicon ($Si(OC_2H_5)_4$).

Examples of the solid ingredient containing niobium include penta etoxyniobium ($Nb(OC_2H_5)_5$) or so. Examples of the solid ingredient containing lithium include (2,2,6,6-tetramethyl-3,5-heptanedionite)lithium (Li(DPM)) or so. Typical examples of the solid ingredient containing tantalum include penta etoxytantalum ($Ta(OC_2H_5)_5$), pentadimethylaminotantalum ($Ta(N(CH_3)_2)_5$), pentadiethylaminotantalum ($Ta(N(C_2H5)_2)_5$), (di-isopropoxy)tris(2,2,6,6-tetramethyl-3,5-heptanedionite)tantalum ($Ta(OiPr)_2(DPM)_3$), etc.

Further, typical examples of the solid ingredient containing titanium include tetra iso-propoxytitanium ($Ti(OCH(CH_3)_2)_4$), tetra n-propoxytitanium ($Ti(OC_3H_7)_4$), tetra dimethylaminotitanium ($Ti(N(CH_3)_2)_4$), tetra diethylaminotitanium ($Ti(N(C_2H_5)_2)_4$), tetra(2,2,6,6,-tetramethyl-3,5heptanedionite)titanium ($Ti(DPM)_4$), (di-tertiarybuthoxy)bis(2,2,6,6-tetramethyl-3.5-heptanedionite)titanium ($Ti(OtBu)_2(DPM)_2$), (di-isopropoxy)bis(2,2,6,6,-tetramethyl-3,5,-heptanedionite)titanium ($Ti(OiPr)_2(DPM)_2$), etc.

Still further, examples of the solid ingredient containing barium include bis(2,2,6,6,-tetramethyl-3,5heptanedionite)barium ($Ba(DPM)_2$) or so. Examples of the solid ingredient containing lead include bis(2,2,6,6,-tetramethyl-3,5heptanedionite)lead ($Pb(DPM)_2$) or so. Furthermore, typical examples of the solid ingredient containing bismuth include bismuth(III) tertiarybthoxy ($Bi(OtBu)_3$), bismuth(III) tertialeabentoxyd ($Bi(OtAm)_3$), triphenyl bismuth ($BiPh_3$), etc.

Moreover, examples of the solid ingredient containing germane include tetra ethoxy germanium ($Ge(OC_2H_5)_4$) or so.

However, it is necessary that these solid ingredients are usually dissolved in organic solvent with concentration of about 0.1 to 1.0 mol/litter and then be employed as the solution material.

The above-mentioned organic solvent to be used as a solvent for a solid ingredient is that having a boiling point usually ranging from 40 □ to 140 □ at an ordinary pressure. Examples of the solvent include such ethers as propyl ether, methylbutyl ether, ethylpropyl ether, ethylbutyl ether, trimethylene oxide, tetrahydrofuran and tetrahydropyran; alcohols such as methyl alcohol, ethyl alcohol, propyl alcohol and butyl alcohol; ketones such as acetone, ethyl methyl ketone, isopropyl methyl ketone and isobutyl methyl ketone; amines such as propylamine, butylamine, diethylamine, dipropylamine and triethylamine; esters such as ethyl acetate, propyl acetate and butyl acetate; and hydrocarbons such as hexane, heptane and octane.

In the following, detailed description will be given of the apparatus for producing powders of metal compound containing oxygen according to the present invention with reference to FIG. 1 to FIG. 8, which however shall never limit the present invention thereto.

Figure 2:
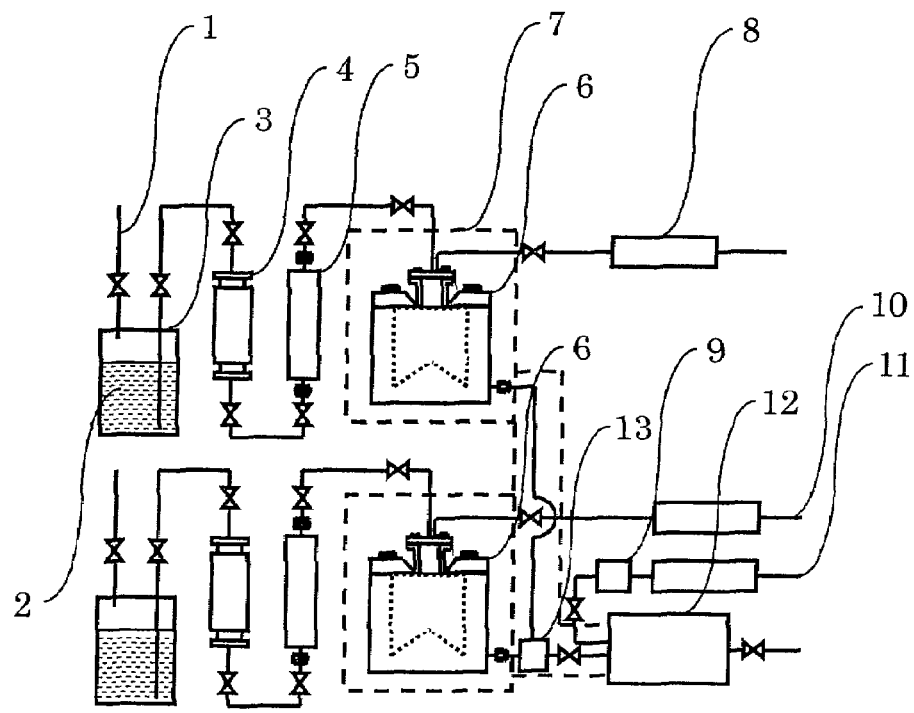
FIG. 2 is a block-diagram illustrating another embodiment of the apparatus for producing powders of metal compound containing oxygen in accordance with the present invention.
Figure 3:
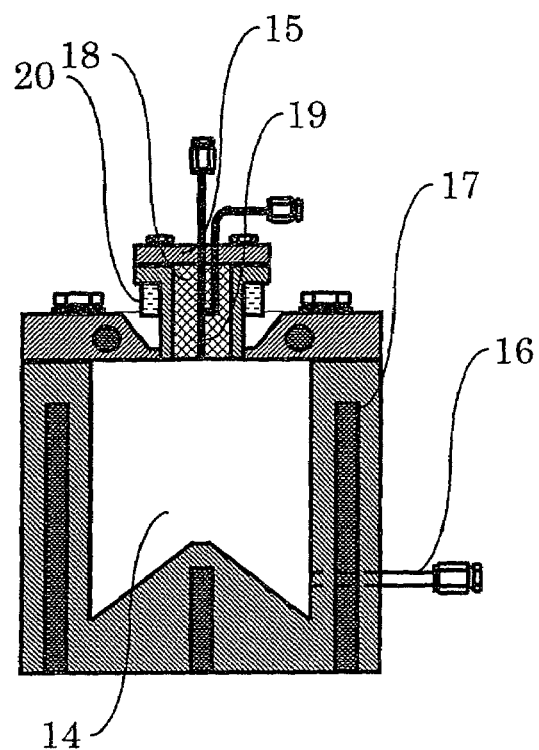
FIG. 3 is a vertical cross-sectional view illustrating one embodiment of a vaporizer employed for the present invention.
Figure 7:
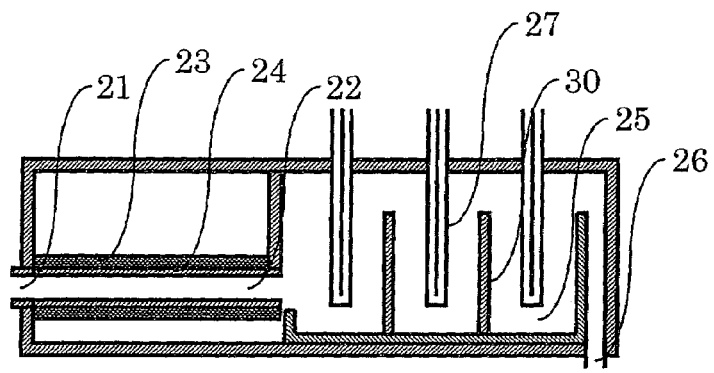
FIG. 7 is a vertical cross-sectional view illustrating still another embodiment of a horizontal reactor aside from FIGS. 4 to 6 employed for the present invention.
Figure 8:
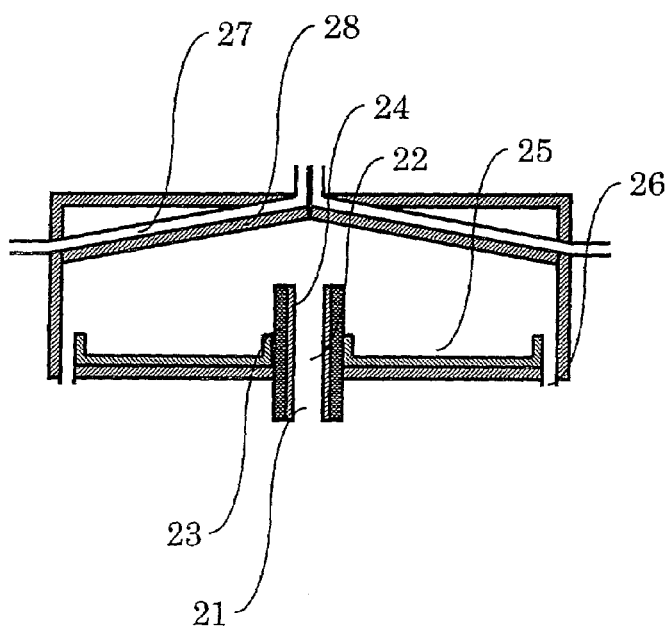
FIG. 8 is a vertical cross-sectional view illustrating one embodiment of vertical reactor employed for the present invention.

FIGS. 1 and 2 are blocks diagram illustrating embodiments of the apparatus for producing powders of metal compound containing oxygen in accordance with the present invention; FIG. 3 is a vertical cross-sectional view illustrating one embodiment of a vaporizer employed for the present invention; and FIGS. 4 to 8 are vertical cross-sectional view illustrating embodiments of the reactor employed for the present invention, wherein FIGS. 4 to 7 illustrate horizontal reactors and FIG. 8 illustrates a vertical reactor.

As shown in FIGS. 1 and 2 respectively, the apparatus for producing powders of metal compound containing oxygen in accordance with the present invention comprises a liquid flow controller 5, a vaporizer 6 and a reactor 12 that reacts the vaporized material and oxygen while heating, cooling, and crystallizing. However, it usually further comprises an inert gas supply line 1, a degasser 4, a heat insulating material 7, a gas mass flow controller 8, a gas preheater 9, a carrier gas supply line 10, an oxygen supply line 11, a gas mixer 13 and so on; and in the case of producing powders of metal compound containing oxygen, a material container 3 filled with the liquid material 2 or the solution material 2 is connected.

As the liquid flow controller 5 in the present invention, a liquid mass flow controller is usually employed.

Furthermore, although the vaporizer employed in the present invention is not particularly specified, for example, a vaporizer with the material feed portion 15 whose interior comprises a corrosion resistant synthetic resin 18 such as fluorocarbon polymers, polyimide-based resin or so, a vaporizer with an ejection tube of double structure consisting of an inner tube for a liquid material or a solution material and an outer tube for a carrier gas as the ejection tube 19 for ejecting and vaporizing the liquid material or the solution material to a vaporizing chamber 14, or a vaporizer having means 20 for flowing cooling water around the outside surface of the material feed portion are exemplified each as shown in FIG. 3. Still further, reference numeral 16 expresses an exhaust slot for the vaporized gas and reference numeral 17 expresses heaters in FIG. 3. Not only a vaporizer vaporizing one kind of material, but also a vaporizer simultaneously vaporizing two kinds or more materials is employable in the present invention.

The reactor used for the present invention consists essentially of means for feeding a gas containing a material and oxygen, means for heating the gas, means for cooling the gas and means for receiving the product. That is, as shown in FIGS. 4 to 8, the reactor consists of a gas feeding inlet 21, passageway 22 as the feeding means for a vaporized gas containing materials and oxygen, a heater 23 for heating the gas from the side of the passageway 22 as the heating means, the cooling means (27-30) to cool the gas at downstream side of the passageway 22, a reservoir 25 as the receiving means for the powders of metal compound containing oxygen as the product and exhaust outlet 26 of the gas. The passageway 22 is surrounded by a cylindrical wall or a rectangular wall, the surface of which is respectively formed preferably with a quartz plate or a quartz layer 24 in order to prevent adhesion of the product generated by the reaction between the material and oxygen.

Figure 4:
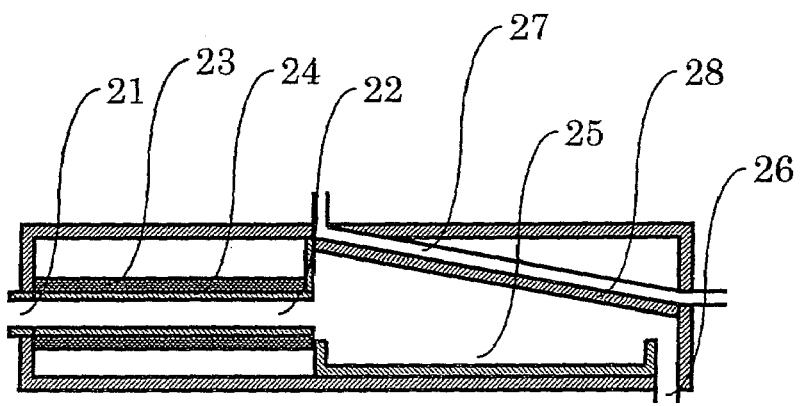
FIG. 4 is a vertical cross-sectional view illustrating one embodiment of a horizontal reactor employed for the present invention.
Figure 5:
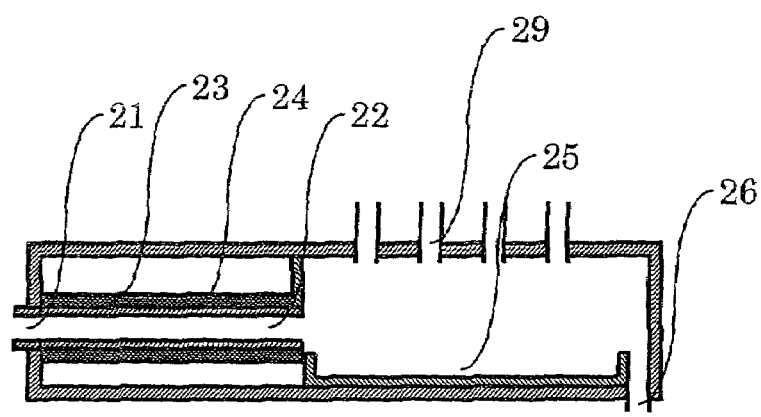
FIG. 5 is a vertical cross-sectional view illustrating another embodiment of a horizontal reactor aside from FIG. 4 employed for the present invention.
Figure 6:
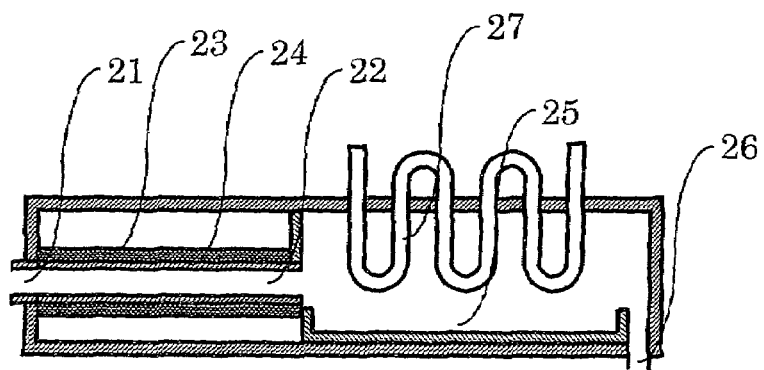
FIG. 6 is a vertical cross-sectional view illustrating another embodiment of a horizontal reactor aside from FIG. 4 and FIG. 5 employed for the present invention.

Further, examples of the foregoing cooling means include a cooling plate 28 provided adjacent a cooling pipe 27 in which a coolant auch as cooling water flows as shown in FIGS. 4 and 8, a coolant supplying pipe 29 conveying cooling gas such as an inert gas or so as shown in FIG. 5 and a cooling pipe 27 in which a coolant such as cooling water flows as shown in FIG. 6. In the case where the cooling plate is employed as the cooling means, partitions 30 for extending the gas passageway may be provided together with the cooling pipe 27 in which the coolant flows as shown in FIG. 7, aiming for increasing the amount of the powders of metal compound containing oxygen as the product. Additionally, a coolant supply pipe or a cooling pipe may be employed as the cooling means other than the cooling plate shown in FIG. 8 for the vertical reactor. Moreover, the reacting means under heating and the cooling means may be separated into different devices in the present invention.

The present invention provides a process for producing powders of metal compound containing oxygen usually with the use of the foregoing apparatus for producing powders of metal compound containing oxygen. In other words, the present invention provides a process for producing powders of metal compound containing oxygen comprising the steps of: feeding at least one material selected from a liquid material and a solution material obtained by dissolving solid ingredient in organic solvent via a liquid flow controller into a vaporizer; vaporizing the materials in the vaporizer; adding oxygen; heating; cooling; and crystallizing.

In the present invention, after setting the material container 3 filled with the material as shown in FIG. 1 or 2, for example, the solution material or the liquid material is introduced into the liquid mass flow controller 5 via the degasser 4 as the effect of pressuring with an inert gas onto the material container 3, is further supplied to the vaporizer 6, and resultantly is vaporized there.

Further in the present invention, before or soon after the gas containing vaporized material is supplied into the reactor, oxygen or a gas containing oxygen will be added. The gas containing material and oxygen is heated by a heater in the reactor to the temperature of about 300 to 1000 □ usually, and the metal compound containing oxygen generates. Regarding with the pressure of the gas, although the reaction may be carried out under the reduced pressure of 0.1 kPa (absolute pressure) or under the compressed pressure of 2 MPa (absolute pressure), without being specified, it is usually the same as the pressure in the vaporizer.

Then, the gas is cooled by the foregoing cooling means provided to the reactor, and metal compounds containing oxygen among the gas are crystallized to powders. In the present invention, the temperature of the gas after being cooled is usually within the range from the liquefaction temperature of the organic solvent to around 200 □ when the organic solvent is present, and usually within the range from 20 □ to around 200 □ when the organic solvent is absent. The powders of the metal compound containing oxygen that crystallized by cooling of the gas will fall over the reservoir as the receiving means for the powders as the product and will be collected after the completion of the production.

This invention will be described in further detail with reference to EXAMPLES, which does not limit the scope of this invention.

EXAMPLES

Example 1

(Fabrication of Vaporizer)

There was prepared a material feed portion 15 in which the inside thereof was constituted of a fluorocarbon polymers (PFA: a polymer of tetrafluoroethylene and perfluorovinylether) 18, and the portion in contact with the outside of the vaporizer was constituted of stainless steel (SUS316). The PFA made portion was a column having an outside diameter of 16 mm and a height of 34.2 mm. The stainless steel outside the column had a thickness of 2.0 mm. Further, an ejection tube with double structure at front end having an internal tube corresponding to a passageway for the material, and an outer tube corresponding to a passageway for a carrier gas was provided separately in two sets. Additionally, a cooling pipe that provides cooling water along the side surface of the material feed portion was equipped as a cooling means for the material feed portion.

There was also prepared, in addition to the foregoing material feed portion 15, as illustrated in FIG. 3, a vaporizer which was made of stainless steel (SUS316) and incorporated with a vaporized gas exhaust slot 16 and a heater 17. The vaporizer had two ejection tubes connecting with a vaporizing chamber. The vaporization chamber 14 was in the form of a column having an inside diameter of 65 mm and a height of 92.5 mm and a protrusion height at the bottom of 27.5 mm. The vaporized gas exhaust port was placed at a height of 15 mm from the bottom of the vaporizer.

(Fabrication of Reactor)

A reactor made of stainless steel (SUS316) was fabricated as shown in FIG. 4. The reactor had the internal sizes of 600 mm in breadth, 300 mm in length and 250 mm in height; the passageway 22 for the gas containing material and oxygen had an inside diameter of 18 mm, and a length of 170 mm; and the reservoir for the powders of metal compound containing oxygen had the sizes of 200 mm in breadth, 200 mm in length and 50 mm in height. Further, a quartz plate having a thickness of 1.2 mm was attached to the side surface of the passageway for the gas. Furthermore, the cooling means for the gas were provided by placing the cooling plate 28 over the reservoir for the powders of metal compound containing oxygen in a manner entirely covering the upper face (angle of inclination: 15 degrees), and by placing the cooling pipe connecting to cooling line for flowing water and to a temperature controller further over the cooling plate.

(Fabrication of Apparatus for Producing Powders of Metal Compound Containing Oxygen)

Subsequently, an apparatus for producing powders of metal compound containing oxygen as shown in FIG. 1 was fabricated by connecting the foregoing vaporizer and reactor with a degasser, a liquid mass flow controller, a carrier gas supply line, an oxygen supply line and so on. Further, the oxygen supply line was settled so as to add oxygen just before the reactor.

(Production of Powders of Metal Compound Containing Oxygen)

A material container filled with the solution material (concentration: 0.3 mol/L) prepared by dissolving $Ti(OiPr)_2(DPM)_2$ in THF solvent and a material container filled with the solution material (concentration: 0.3 mol/L) prepared by dissolving $Ba(DPM)_2$ in THF solvent were settled to the above production apparatus, and the production of barium titanate powders was carried out.

The vaporization chamber was set on 1.3 kPa (10 torr) and at the temperature of 270 □, the solution material in which $Ti(OiPr)_2(DPM)_2$ as a solid material dissolved in THF as a solvent and the solution material in which $Ba(DPM)_2$ as a solid material dissolved in THF as a solvent were fed at a flow rate of 0.5 g/min and 0.6 g/min respectively and further nitrogen gas was supplied at a flow rate of 600 milliliter/min, and then the solution material was vaporized in the chamber. During the foregoing process, cooling water was supplied to maintain the temperature of the stainless steel part on the side surface of the material feed portion at 30±2 □.

On the other hand, the internal pressure of the reactor was set on 1.3 kPa, the side temperature of the passageway 22 of gas containing the material and oxygen was set at 600 □, and cooling water was supplied to maintain the temperature of the gas being discharged from the exhaust outlet 26 of the gas within 75±2 □. At the same time, oxygen heated at 270 □ was added to the gas containing the vaporized material with the flow rate of 2000 milliliter/min just before the reactor.

(Evaluation of Powders of Metal Compound Containing Oxygen)

A crystallized particle size measurement with the use of a scanning electron microscope (SEM) and a composition analysis with the use of a X-ray Fluorescence Spectroscopy (XRF) about the resultant powders of barium titanate were carried out. As a result, the crystallized particle sizes were within the range of 0.01 to 0.1 μm, and the composition was recognized that Ti atom was 0.95 to 1.05 per Ba atom.

Example 2

(Fabrication of Reactor)

A reactor made of stainless steel (SUS316) was fabricated as shown in FIG. 5. The reactor had the internal sizes of 600 mm in breadth, 300 mm in length and 250 mm in height; the passageway 22 for the gas containing material and oxygen had an inside diameter of 18 mm, and a length of 170 mm; and the reservoir for the powders of metal compound containing oxygen had the sizes of 200 mm in breadth, 200 mm in length and 50 mm in height. Further, a quartz plate having a thickness of 1.2 mm was attached to the side surface of the passageway for the gas. Furthermore, the cooling means for the gas were provided by placing 20 units of the coolant (nitrogen) supplying pipe 29 with an inner diameter of 10 mm over the reservoir for the powders of metal compound containing oxygen in a manner entirely covering the upper face.

(Production and Evaluation of Powders of Metal Compound Containing Oxygen)

The production of barium titanate powders was carried out in a similar manner as Example 1 except that the above reactor was employed. As a result of the evaluation about the resultant powders of barium titanate in the same manner as Example 1, the crystallized particle sizes were within the range of 0.01 to 0.1 μm, and the composition was recognized that Ti atom was 0.96 to 1.05 per Ba atom.

Example 3

(Fabrication of Reactor)

A reactor made of stainless steel (SUS316) was fabricated as shown in FIG. 6. The reactor had the internal sizes of 600 mm in breadth, 300 mm in length and 250 mm in height; the passageway 22 for the gas containing material and oxygen had an inside diameter of 18 mm, and a length of 170 mm; and the reservoir for the powders of metal compound containing oxygen had the sizes of 200 mm in breadth, 200 mm in length and 50 mm in height. Further, a quartz plate having a thickness of 1.2 mm was attached to the side surface of the passageway for the gas. Furthermore, the cooling means for the gas were provided by placing the cooling pipe 27 with an inner diameter of 6.5 mm connected to the cooling line and the temperature controller and further flowing water as the coolant over the reservoir for the powders of metal compound containing oxygen in a manner entirely covering the upper face.

(Production and Evaluation of Powders of Metal Compound Containing Oxygen)

The production of barium titanate powders was carried out in a similar manner as Example 1 except that the above reactor was employed. As a result of the evaluation about the resultant powders of barium titanate in the same manner as Example 1, the crystallized particle sizes were within the range of 0.01 to 0.1 μm, and the composition was recognized that Ti atom was 0.95 to 1.04 per Ba atom.

Example 4

(Fabrication of Reactor)

A reactor made of stainless steel (SUS316) was fabricated as shown in FIG. 7. The reactor had the internal sizes of 600 mm in breadth, 300 mm in length and 350 mm in height; the passageway 22 for the gas containing material and oxygen had an inside diameter of 18 mm, and a length of 170 mm; and the reservoir for the powders of metal compound containing oxygen had the sizes of 200 mm in breadth, 200 mm in length and 50 mm in height. Further, a quartz plate having a thickness of 1.2 mm was attached to the side surface of the passageway for the gas. Furthermore, the cooling means for the gas were provided by placing 3 pieces of the cooling plate 30 inside of which cooling water flows and having the size of 10 mm in breadth, 290 mm in length and 250 mm in height; and placing 2 pieces of the partition having the size of 5 mm in breadth, 290 mm in length and 250 mm in height with the same spaces.

(Production and Evaluation of Powders of Metal Compound Containing Oxygen)

The production of barium titanate powders was carried out in a similar manner as Example 1 except that the above reactor was employed. As a result of the evaluation about the resultant powders of barium titanate in the same manner as Example 1, the crystallized particle sizes were within the range of 0.01 to 0.1 μm, and the composition was recognized that Ti atom was 0.95 to 1.05 per Ba atom.

INDUSTRIAL APPLICABILITY

In the present invention, it is easy to control the size or so of the powders of metal compound containing oxygen by adjusting the condition such as the concentration or the feed amount of material or oxygen contained in the gas introduced to the reactor, heating temperature, cooling method, cooling temperature and so on. Further, the present invention enables to continuously produce the powders of metal compound containing oxygen with the use of the liquid material of high purity, the solution material prepared by dissolving solid ingredients of high purity in organic solvent. Accordingly, as described in Examples, it became possible to easily mass-produce the fine powders of metal compound containing oxygen as well as reducing the production cost.

While there has been shown and described what are at present considered the preferred embodiments of the invention, it will be obvious to those skilled in the art that various changes and modification may be made therein without departing from the scope of the invention defined by the appended claims.

What is claimed is:

1. An apparatus for producing powders of metal compound containing oxygen comprising a liquid flow controller, a vaporizer and a reactor, which consists essentially of:
   means for feeding a gas containing a material and oxygen;
   means for heating the gas from the side surface of the feeding means;
   means having a partition structure, for extending a gas passageway and cooling the gas, positioned at the downstream side of the feeding means; and
   means for receiving the product generated by the reaction.

2. The apparatus according to claim 1, wherein said feeding means is a passageway surrounded by a cylindrical wall or a rectangular wall.

3. The apparatus according to claim 2, wherein said cylindrical wall or said rectangular wall is formed with quartz.

* * * * *